United States Patent Office 3,586,576
Patented June 22, 1971

3,586,576
FORMING SOFTWOOD PLYWOOD
Leopold F. Bornstein, King of Prussia, Pa., assignor to Georgia Pacific Corporation, Portland, Oreg.
No Drawing. Filed Feb. 19, 1969, Ser. No. 800,760
Int. Cl. C09j 3/16
U.S. Cl. 156—335                                    1 Claim

ABSTRACT OF THE DISCLOSURE

The excessive penetration of softwood plies by alkaline, water solutions of thermosetting phenolic resins can be controlled by incorporating aluminum sulphate in the resin solution prior to application to the plies.

---

This invention relates to a method for forming softwood plywood especially Douglas fir and Southern pine.

Softwood plywoods are almost exclusively glued by means of water solutions of phenolic resins. These solutions are highly alkaline and contain on the order of 35 to 55 percent solids. While these alkaline, phenolic resins, on curing, give the desired water and heat resistance, the bonding strength is often inadequate. This problem has been traced, in part, to the excessive penetration of the softwood plies by the resin. Softwood is characterized by non-uniformity and varies not only from one geographical location to another, but also from one growing season to another. This non-uniformity is particularly apparent in the degree of porosity and/or absorbency of the softwood.

It is customary to blend filler or extender material with the resin solution used for bonding the plies, i.e., ground corncobs and/or cereal flour. If the resin solution is absorbed excessively but not the filler material, there is the problem of dry outs. Similarly, extensive penetration of the resin formulation will lead to poor bonding, and reduction of wood strength due to embrittlement.

As a result, it may be necessary to prepare and/or adapt resins to the particular time. This obviously presents a number of problems and adds to the expense of the final product. For example, one such method comprises use of more highly reacted resins. These, however, age too fast and have a short shelf life. There is also an additional problem of precuring, with the resin setting up permaturely. If, as is often the case, the wood plies are hot at the time of application of the resin solution, the resin may actually cure before it bonds the plies, again providing a deficient bond.

Instead of employing a more highly reacted resin, the curing speed of the resin can be accelerated by additional use of caustic prior to application to the wood. While this will increase the speed of cure, it also increases the penetration, again, an undesirable feature.

In accordance with the present invention, it has been found that the addition of aluminum sulphate to the phenolic resin advances the resin, i.e., increases its molecular weight, and provides a reduction of penetration, an increase in the speed of cure, and/or lowering of the cure temperature. The amount of aluminum sulphate to be added comprises from about 2% to about 5% by weight based on resin solids. Care must be taken to avoid excessive aluminum sulphate as indicated by precipitation of the resin. The purpose of addition of the aluminum sulphate is to advance the molecular size, i.e., cause chain growth, and not to effect full solubility of the resin. If too little aluminum sulphate is added, there will be too little chain growth and thus insufficient reduction in resin penetration.

The phenolic resin with which the present invention is particularly useful is characterized as alkali catalyzed, completely reacted, resins having essentially complete water solubility, and having a viscosity in the range of about 400 to 1,500 c.p.s. at 40±2% by weight solids in water. The resin solution has a pH in the range of about 10–13.

A typical resin for softwood plywood was prepared by reacting 323 parts by weight of phenol with 544 parts by weight of a 44% aqueous solution of formaldehyde, and 2.4 parts by weight of a 50% aqueous caustic soda solution. The reactants were mixed together and reacted for 30 minutes at 95–100° C. An additional part of the caustic soda solution was then added and reaction was continued for 15 minutes at 93–95° C. To the reaction were then added 51 parts of water and the reactants were cooled to 80° C. An additional 10 parts by weight of the caustic soda solution were introduced followed by 146 parts of water. The reactor contents were then again brought to 80° C. and 99 parts of the caustic soda solution were added. The material in the reactor was then maintained at temperature in the range of 93–95° C. until the contents reached a viscosity of 85 c.p.s. At that time, 68 parts by weight of water were added and the reaction mixture was cooled to a temperature of 35–40° C. There were then added 34 parts by weight of acetone and 25 parts by weight of the caustic soda solution, the mixture was cooled to room temperature and the resin was discharged.

The resulting resinous product had a solids content of 40±2%, to pH of about 11.5 and a viscosity at 25° C. in the range of 400 to 600 c.p.s.

The foregoing resin is merely typical and many variations are possible, as is readily understood by those skilled in the art. The only requirement other than those specified previously is that the resin be useful with softwood such as Douglas fir and Southern pine, particularly in the production of waterproof plywood of the exterior type or interior grade plywood with special water resistance requirements. The requirements for these plywood grades are provided in the U.S. Department of Commerce (National Bureau of Standards) Product Standard PS 1–66. Plywood made in accordance with the present invention meets these specifications and complies with the adhesive policy established by the American Plywood Association.

The above-described resin composition can be utilized in the following manner:

To a mixture comprising 675 parts by weight of water, 350 parts of ground corncobs (such as furafil), and 1,500 parts of wheat flour (formed by mixing the ingredients about 5 minutes at 75° F.) are added 150 parts of the resin solution. After 3 minutes of mixing, 120 parts of 50% aqueous caustic soda solution are added. Mixing is continued for 10 minutes and 90 parts of a 44% aqueous solution of aluminum sulphate are added. After 3 minutes of mixing, 2,300 lbs. of the resin solution are added to provide a mix having a viscosity at 90° F. of about 6,000 c.p.s. The resin solids level is 26.4%.

Another example of a typical adhesive formulation comprises 2,500 lbs. of resin solution (containing 42% solids), 650 lbs. of water, 400 lbs. of ground corncobs, 100 lbs. of wheat flour, 100 lbs. of a 40% solution of aluminum sulphate in water, and 120 lbs. of a 50% solution of caustic soda.

In the foregoing adhesive compositions, the ground corncobs serve as an extender-filler material. The wheat flour functions as a tackifying agent to provide better prepressing qualities. The caustic soda serves the dual function of solubilizing the filler material and alkalizing the mixture to maintain the pH in the range of about 10 to 13, thus insuring a solubility of the mix and proper curing speed.

In general, the resin adhesive composition dosed with aluminum sulphate will be utilized shortly after mixing. It can, however, be kept for up to about 24 hours without adverse results. The dosed formulation should, of course, be utilized before it advances to a point that it cannot be readily applied to the surface of the veneers.

Proper usage of aluminum sulphate in accordance with the present invention can reduce by about 25% the time required to cure a resin at any particular curing temperature. The usual curing temperature is in the range of 250° F. to 350° F. Similarly, a formulation that ordinarily cures at 280° F. can, by proper use of aluminum sulphate, be cured in the same time at 250° F.

Following the teachings of the present invention and employing the present composition, previously described, ½-inch plywood was prepared in the usual manner with one panel per opening, a spread of 85–86 lbs. and assembly time of 20 minutes, a press temperature of 285° F. and a press pressure of 200 p.s.i. The press time necessary for obtaining good bonding was 4¾ minutes. When the identical procedure was repeated, using the same adhesive except that it was free of aluminum sulphate, a press time of 8 minutes was required.

The procedure was generally repeated for the production of ⅝-inch plywood except that the spread was 84–85 lbs. and the press temperature was 300° F. The required press time was 5½ minutes utilizing the adhesive containing aluminum sulphate. A press time of 9½ minutes was required when the adhesive contained no aluminum sulphate.

From the foregoing it is believed evident that the process of the present invention significantly improves the process for forming softwood plywood. In all of the examples described above, the bonding was satisfactory and the products met the standards previously described.

What is claimed is:

1. In the process of forming plywood from softwood plies wherein an alkaline, water solution of a thermosetting, phenolic resin is applied to the plies and the plies are bonded to each other by the application of heat and pressure, the improvement which comprises incorporating aluminum sulphate in said resin in an amount of from about 2% to about 5% by weight based on resin solids prior to application of said resin to said plies.

References Cited

UNITED STATES PATENTS

| | | | |
|---|---|---|---|
| 3,028,285 | 4/1962 | Rogers | 156—335X |
| 3,035,966 | 5/1962 | Stuta | 156—335X |
| 3,039,981 | 6/1962 | Shannon et al. | 260—293 |

LELAND A. SEBASTIAN, Primary Examiner

E. A. MILLER, Assistant Examiner

U.S. Cl. X.R.

260—29.3